US007285784B2

(12) United States Patent
Rowland et al.

(10) Patent No.: US 7,285,784 B2

(45) Date of Patent: Oct. 23, 2007

(54) REAL TIME METHOD AND COMPUTER SYSTEM FOR IDENTIFYING RADIOACTIVE MATERIALS FROM HPGE GAMMA-RAY SPECTROSCOPY

(75) Inventors: Mark S. Rowland, Alamo, CA (US); Douglas E. Howard, Livermore, CA (US); James L. Wong, Dublin, CA (US); James L. Jessup, Tracy, CA (US); Greg M. Bianchini, Livermore, CA (US); Wayne O. Miller, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 5 days.

(21) Appl. No.: 10/828,010

(22) Filed: Apr. 19, 2004

(65) Prior Publication Data

US 2004/0195517 A1 Oct. 7, 2004

Related U.S. Application Data

(63) Continuation-in-part of application No. 10/410,128, filed on Apr. 8, 2003.

(60) Provisional application No. 60/427,978, filed on Nov. 19, 2002.

(51) Int. Cl.
*G01T 1/24* (2006.01)

(52) U.S. Cl. ............................ 250/370.15; 250/336.1; 250/358.1; 376/159

(58) Field of Classification Search ........... 250/370.15, 250/336.1, 358.1; 376/159
See application file for complete search history.

(56) References Cited

U.S. PATENT DOCUMENTS

| | | | | |
|---|---|---|---|---|
| 4,361,534 | A * | 11/1982 | Borsaru et al. | 376/159 |
| 4,774,049 | A * | 9/1988 | Impink et al. | 376/245 |
| 5,012,498 | A * | 4/1991 | Cuzin et al. | 378/22 |
| 6,781,134 | B1 * | 8/2004 | Murray et al. | 250/370.13 |
| 6,791,089 | B1 * | 9/2004 | Caffrey et al. | 250/358.1 |
| 2003/0165213 | A1 * | 9/2003 | Maglich | 376/159 |

FOREIGN PATENT DOCUMENTS

WO WO 96/15442 * 5/1996

OTHER PUBLICATIONS

Parker et al., "A Portable System for Nuclear, Chemical Agent and Explosive Identification," Jul. 1999, SPIE, vol. 3769, pp. 43-50.*

* cited by examiner

*Primary Examiner*—Sandra O'Shea
*Assistant Examiner*—Mary Zettl
(74) *Attorney, Agent, or Firm*—James S. Tak; John H. Lee

(57) ABSTRACT

A real-time method and computer system for identifying radioactive materials which collects gamma count rates from a HPGe gamma-radiation detector to produce a high-resolution gamma-ray energy spectrum. A library of nuclear material definitions ("library definitions") is provided, with each uniquely associated with a nuclide or isotope material and each comprising at least one logic condition associated with a spectral parameter of a gamma-ray energy spectrum. The method determines whether the spectral parameters of said high-resolution gamma-ray energy spectrum satisfy all the logic conditions of any one of the library definitions, and subsequently uniquely identifies the material type as that nuclide or isotope material associated with the satisfied library definition. The method is iteratively repeated to update the spectrum and identification in real time.

20 Claims, 6 Drawing Sheets

REAL TIME METHOD AND COMPUTER SYSTEM FOR IDENTIFYING RADIOACTIVE MATERIALS FROM HPGE GAMMA-RAY SPECTROSCOPY

CROSS-REFERENCE TO RELATED APPLICATIONS

This application is a Continuation-in-Part of U.S. patent application Ser. No. 10/410,128 filed Apr. 8, 2003 entitled "Radiation Detection Systems for Portable Gamma-Ray Spectroscopy" which claims priority to Provisional Patent Application 60/427,978 filed Nov. 19, 2002 entitled, "Radiation Detection and Analysis Assembly for Portable Gamma-Ray Spectroscopy" both of which are incorporated herein by this reference.

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to radiation detection systems, and more particularly to a real time method and system of identifying nuclear materials, i.e. nuclides or isotope types, from HPGe gamma-ray spectroscopy.

BACKGROUND OF THE INVENTION

Gamma-ray spectroscopy may be performed using a scintillator (e.g. NaI) or a diode where the gamma-ray energy response depends on the resolution of the detector. Scintillators are certain to within about 10% of the energy, and diodes to within about 0.1%. High-purity germanium (HPGe) radiation detectors are one type of diode detector known for their performance and reliability characteristics and have become a standard by which other radiation detectors are compared. HPGe detector systems have long been the standard for critical applications including uranium enrichment and plutonium isotopic analysis, among others. Combining this high performance with the additional property of high efficiency, HPGe detectors provide very high resolution radio-nuclide spectra within a minimum acquisition time. Therefore, HPGe detector systems are recognized as a basic tool for isotopic analysis.

The better diode performance, however, comes at the price of complexity. HPGe detector systems have typically required extensive support equipment, such as signal processing electronics for data acquisition (shaping amplifier, test pulser), a high voltage power supply for detector bias, a multi-channel analyzer (MCA), a computer including requisite software necessary for spectral analysis, and a continuous supply of liquid nitrogen (LN) to maintain the detector at its proper operating temperature. The requirement of liquid cryogens for cooling the diode are especially taxing on such detector systems by increasing weight and power requirements. And low noise signal processing electronics consume large amounts of power, requiring a high capacity power source. As a result, HPGe detectors have typically been utilized only in the laboratory, and not for field operation. Moreover, building a radiation detector utilizing the desirable diode detector has usually resulted in systems that are not highly portable by humans, such as handheld detectors.

Furthermore, while most real-time detectors have very limited energy resolution, the high resolution provided by a HPGe gamma-radiation detector enables the detection of the nearly unique existence of certain gamma-rays. Certain sets of gamma-rays from nuclides are unique. This opportunity has not arisen with the low resolution detectors due to lack of information content. Therefore there have been a dearth of gamma-ray-energy-set-peak-identifiers that run in real-time, process high resolution spectral features, and that need to or want to benefit from the wonderful complexity present in HPGe detectors.

In summary, what is needed is an improved radiation detection system, such as an HPGe gamma-ray detector, which addresses power requirements, weight, and other limitations traditionally present with diode detectors, to enable field portability, such as by handheld operation or toting on a user's person. Moreover, there is a need for a real-time method/system for identifying radioactive nuclear materials such that field analysis may be performed together with detection for first responders.

SUMMARY OF THE INVENTION

One aspect of the present invention includes a radiation detection system comprising: a radiation detector; at least two volumetrically-nested enclosures successively encapsulating the detector with adjacent enclosures suspension-mounted to each other via suspension-mounting means and at least one of the enclosures comprising a thermal shield, for thermally isolating the detector; a cooler capable of cooling the detector to cryogenic temperatures without consuming cryogens due to the heat load reduction by the enclosures and the reduction in power requirements of the cooler caused thereby; and a power source for supplying power to the system, including to the cooler.

Another aspect of the present invention includes a portable gamma ray detection apparatus comprising: a gamma ray detector; a compact isolation structure having at least two volumetrically-nested enclosures successively encapsulating the detector with adjacent enclosures suspension-mounted to each other via suspension-mounting means and at least one of the enclosures comprising a thermal shield, for thermally isolating the detector; a cooler capable of cooling the detector to cryogenic temperatures without consuming cryogens due to the heat load reduction by the isolation structure and the reduction in the power requirements of the cooler caused thereby; means for spectroscopically processing the gamma ray data and determining isotopes therefrom; and a lightweight portable power source for supplying power to the apparatus, including to the cooler and the processing means, and reducing the weight of the apparatus to enable handheld operation or toting on a user's person.

And another aspect of the present invention includes an assembly for thermally isolating a radiation detector in a radiation detection apparatus having a cooler for cooling the detector, comprising: at least two volumetrically-nested enclosures successively encapsulating the detector with adjacent enclosures suspension-mounted to each other via suspension-mounting means and at least one of the enclosures comprising a thermal shield, wherein the enclosures reduce the heat load to the detector and reduce the cooler power requirements to enable low-power mechanical cooling of the detector to cryogenic temperatures without consuming cryogens.

And another aspect of the present invention includes a real-time method in a computer system for identifying radioactive materials, the method comprising: providing a library of nuclear material definitions ("library definitions") each uniquely associated with a nuclide or isotope material and each comprising at least one logic condition associated with a spectral parameter of a gamma-ray energy spectrum; collecting gamma count rates from a HPGe gamma-radiation detector to produce a high-resolution gamma-ray energy spectrum; determining whether the spectral parameters of said high-resolution gamma-ray energy spectrum satisfy all the logic conditions of any one of said library definitions; and uniquely identifying the material type as that nuclide or isotope material associated with the satisfied library definition.

Another aspect of the present invention includes a computer system for identifying radioactive materials, the system comprising: a gamma-ray detection module that converts gamma rays into electrical signals from which gamma count rates are collected and a gamma-radiation energy spectrum is produced; a library module of nuclear material definitions ("library definitions") each uniquely associated with a nuclide or isotope material and each comprising at least one logic condition associated with a spectral parameter of a gamma-ray energy spectrum; a compliance module adapted to determine whether the spectral parameters of said high-resolution gamma-ray energy spectrum satisfy all the logic conditions of any one of said library definitions; and an identification module adapted to uniquely identify the material type as that nuclide or isotope material associated with the compliant library definition.

And another aspect of the present invention includes a computer program product comprising: a computer usable medium having computer readable program code embodied therein for causing the identification of radioactive materials, the computer readable program code comprising: a database comprising a library of nuclear material definitions ("library definitions") each uniquely associated with a nuclide or isotope material and each comprising at least one logic condition associated with a spectral parameter of a gamma-ray energy spectrum; computer readable program code means for collecting gamma count rates collecting gamma count rates from a HPGe gamma-radiation detector to produce a high-resolution gamma-ray energy spectrum; computer readable program code means for determining whether the spectral parameters of said high-resolution gamma-ray energy spectrum satisfy all the logic conditions of any one of said library definitions; and computer readable program code means for uniquely identifying the material type as that nuclide or isotope material associated with the satisfied library definition.

And another aspect of the present invention includes a real-time method in a computer system for gamma-ray energy calibration comprising: providing a database of predetermined gamma-ray energy coefficients associated with various temperature ranges; and automatically deriving the energy calibration by utilizing the energy calibration coefficients of the database to map the relationship between system component temperatures and current energy calibration.

BRIEF DESCRIPTION OF THE DRAWINGS

The accompanying drawings, which are incorporated into and form a part of the disclosure, are as follows.

DETAILED DESCRIPTION

The present invention is directed to a radiation detection system employing a volumetrically-nested thermal isolation assembly which enables heat load reduction on a diode detector, such as a HPGe crystal. The heat load reduction in turn enables the use of a low power electromechanical cooler to provide cryogenic cooling without the use of liquid cryogens. By reducing the power requirements necessary for operation, the weight of such a system can be effectively reduced to enable hand-held or user totable battery-operation in nuclear material location, identification, and material configuration in the field.

Figure 1:
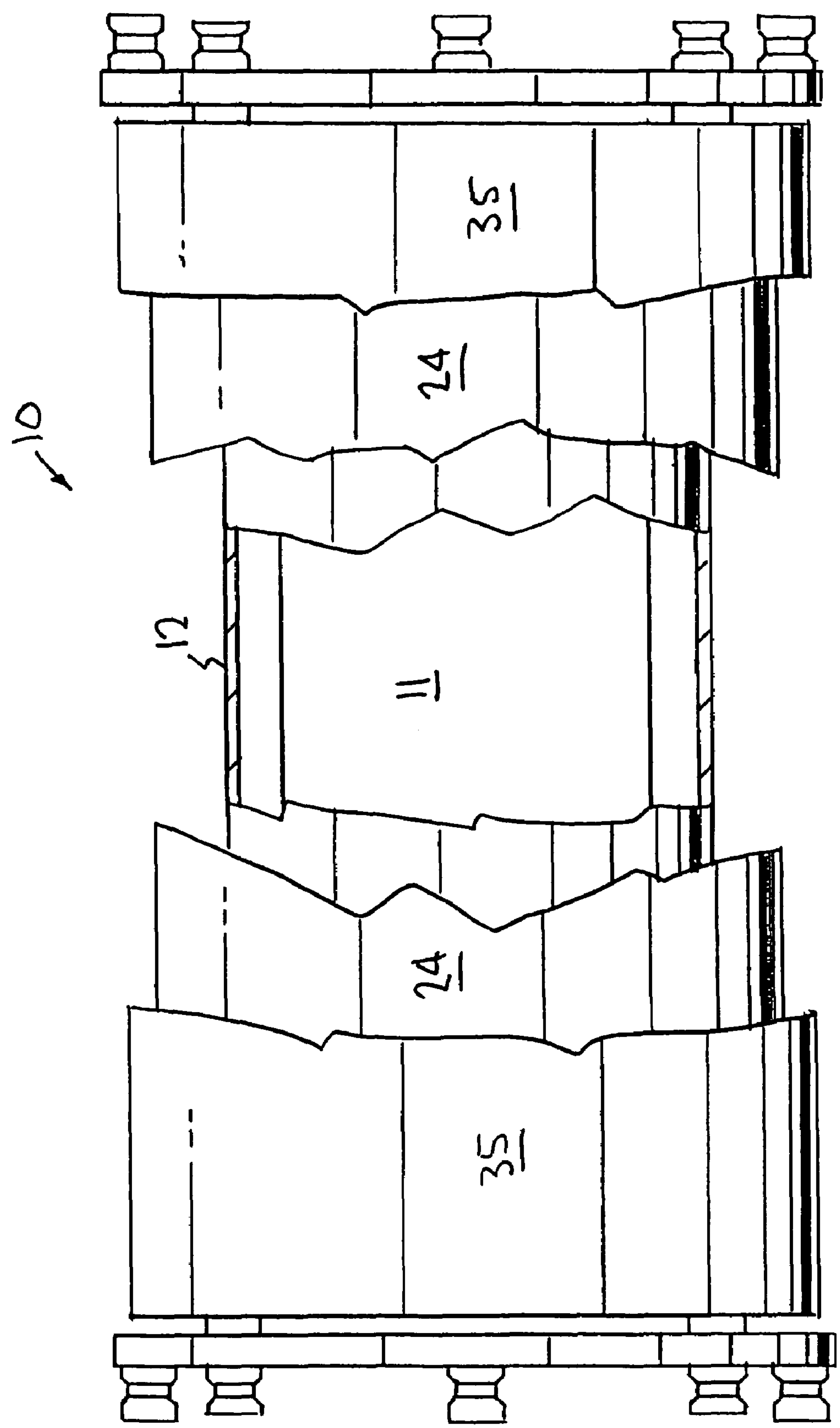
FIG. 1 is a partially broken side view of an exemplary embodiment of the thermal isolation structure of the present invention.
Figure 2:
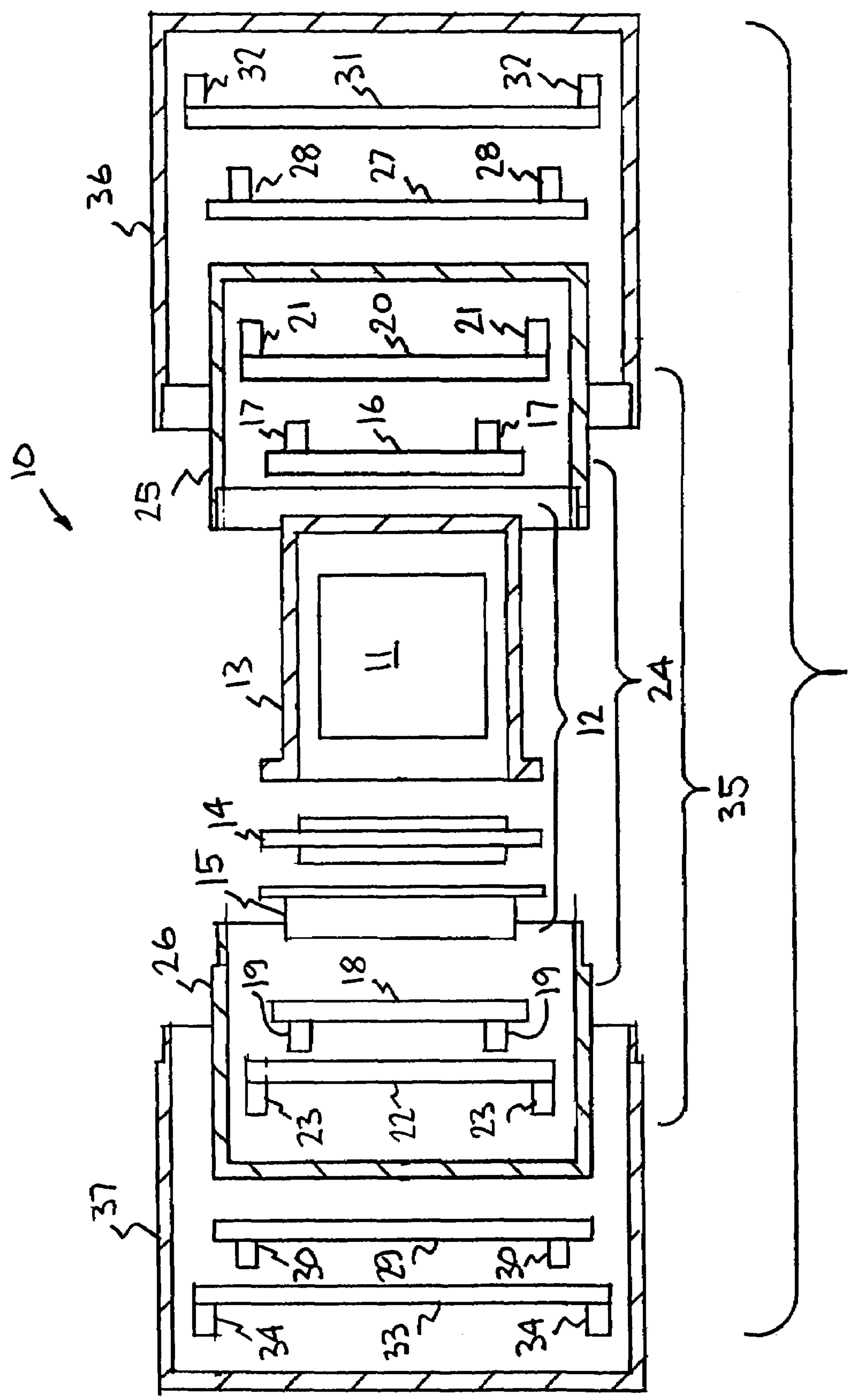
FIG. 2 is an exploded cross-sectional view of the exemplary embodiment of FIG. 1 illustrating the assembly of the volumetrically-nested arrangement of successive enclosures and the suspension mounting therebetween

FIGS. 1 and 2 show an exemplary thermal isolation structure of the present invention, generally indicated at reference character 10, and also utilized in the radiation detection apparatus or system of the present invention. A radiation detector, such as a HPGe crystal 11 for gamma ray detection, is positioned at the core of the structure 10 within a first enclosure 12 thereof using various crystal mounting methods (not shown). For example, in one crystal mounting process, the detector crystal has a right circular configuration with chamfered edges that is held by two chamfered rings pinching opposite ends of the crystal. The crystal holder rings are thermally insulating and are captive in an enclosing can of the first enclosure such that the crystal does not touch any metal structure. Additionally, the crystal holder rings may be spring loaded for impact tolerance. Electrical contacts are made through one end of the enclosing can/first enclosure. The crystal may be an N or P type semiconductor and is electrically contacted via insulating feedthroughs. An insulating environment within the first enclosure is provided by filling the first enclosure (beyond the pinching rings) with a non-conductive gas or evacuated of any atmosphere depending on how close the crystal is to a structure that will electrically arc, to prevent arcing. A second crystal mounting process may use non-thermally-conductive setscrews to pinch the crystal sides, with the setscrews impinging on the crystal from a surrounding support structure. A still another crystal mounting method may employ building an entirely dielectric holding can (i.e. first enclosure).

The thermal isolation structure 10 shown in FIGS. 1 and 2 has a structurally-rigid construction (e.g. aluminum or other lightweight metal or alloy construction) with at least two enclosures, such as 12, 24, and 35, successively encapsulating the mounted crystal in a volumetrically-nested arrangement, i.e. each succeeding enclosure (when taken in the radially outward direction starting at the core) completely contains, encloses, and/or encapsulates the preceding enclosure within its volume. As shown in FIG. 2, each enclosure preferably includes two sections which are connectable to each other to form an enclosed volume. For convenience, each section of a connecting pair may be described as either a can section or a cap section based on a chosen order of assembly, but is not intended to limit the sections to a particular structural form or function. Thus, the first enclosure 12 includes a first can section 13, and a first cap section 15. Similarly, the second enclosure 24 includes a second can section 25 and second cap section 26, and the third enclosure 35 includes a third can section 36 and third cap section 37. The first enclosure comprising sections 13 and 15 may also enclose a base 14 therein used to support the crystal mounting discussed above. And for each enclosure, one of the sections has a first end, and the other section has a second end, with the first and second ends opposite each other when the sections are connected. As shown in the drawings, the first and second ends of all the enclosures are preferably coaxially aligned, to provide a simplified design and assembly. Furthermore, each of the enclosures may have a substantially cylindrical configuration volumetrically-nested with respect to each other in a telescoping and coaxial arrangement as shown in the drawings.

Additionally, at least one of the enclosures includes a thermal shield, i.e. a low-emissivity IR-reflecting shield, exhibiting high IR reflection properties, e.g. approximately 98% reflection of IR photons. The thermal shield may be formed by a suitable coating process which coats a highly reflective material, such as gold, on the surface of the enclosure(s). For example, in one commercially available coating process, aluminum pieces are first polished, plated with nickel (e.g. 15 microns), and then plated with gold (e.g. 75 microns) such that the surface is highly reflective.

Figure 3:
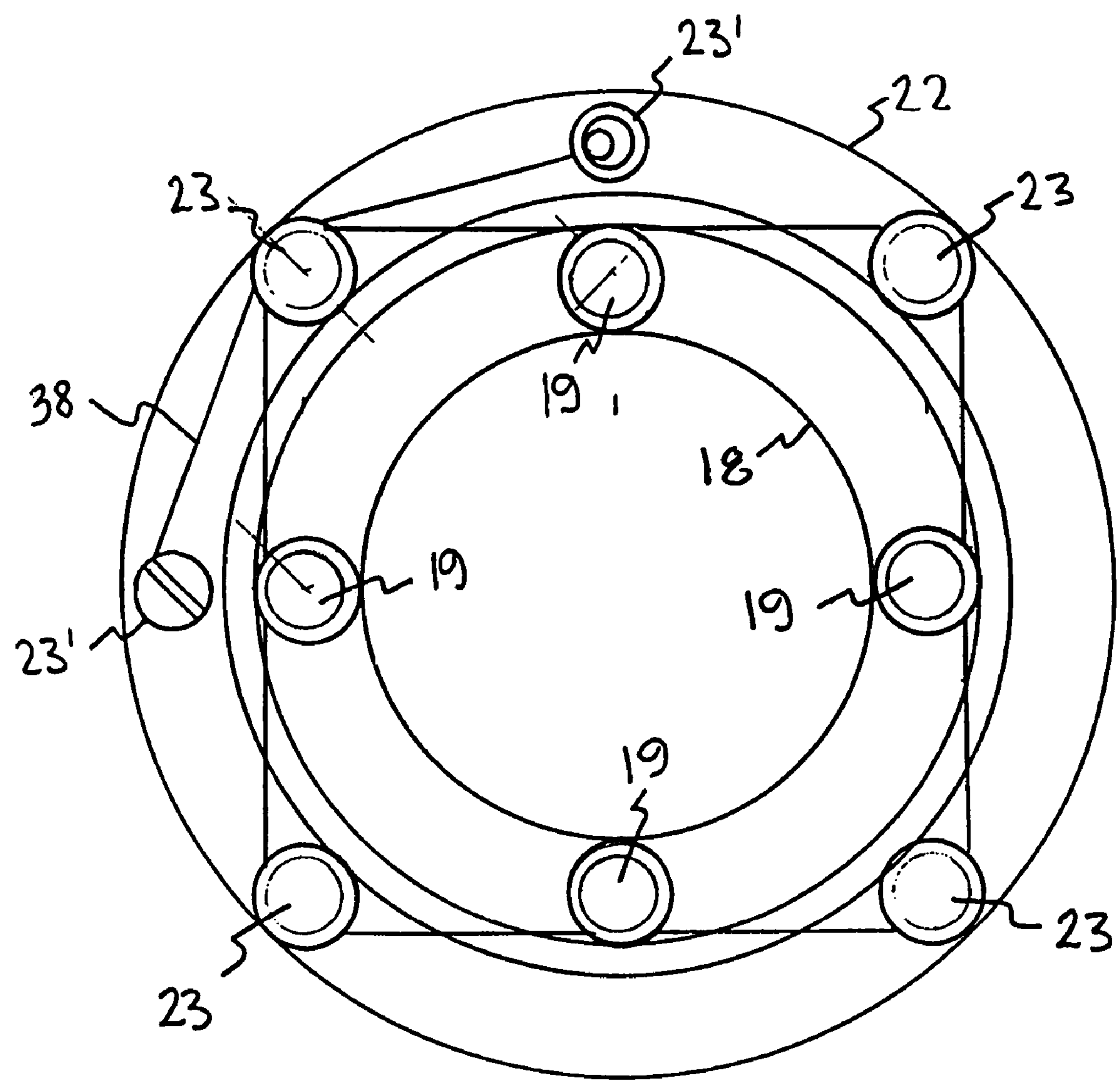
FIG. 3 is a plan view of an exemplary embodiment of the suspension-mounting means, having an inner ring and an outer ring suspended from each other via a low thermally conductive string.
Figure 4:
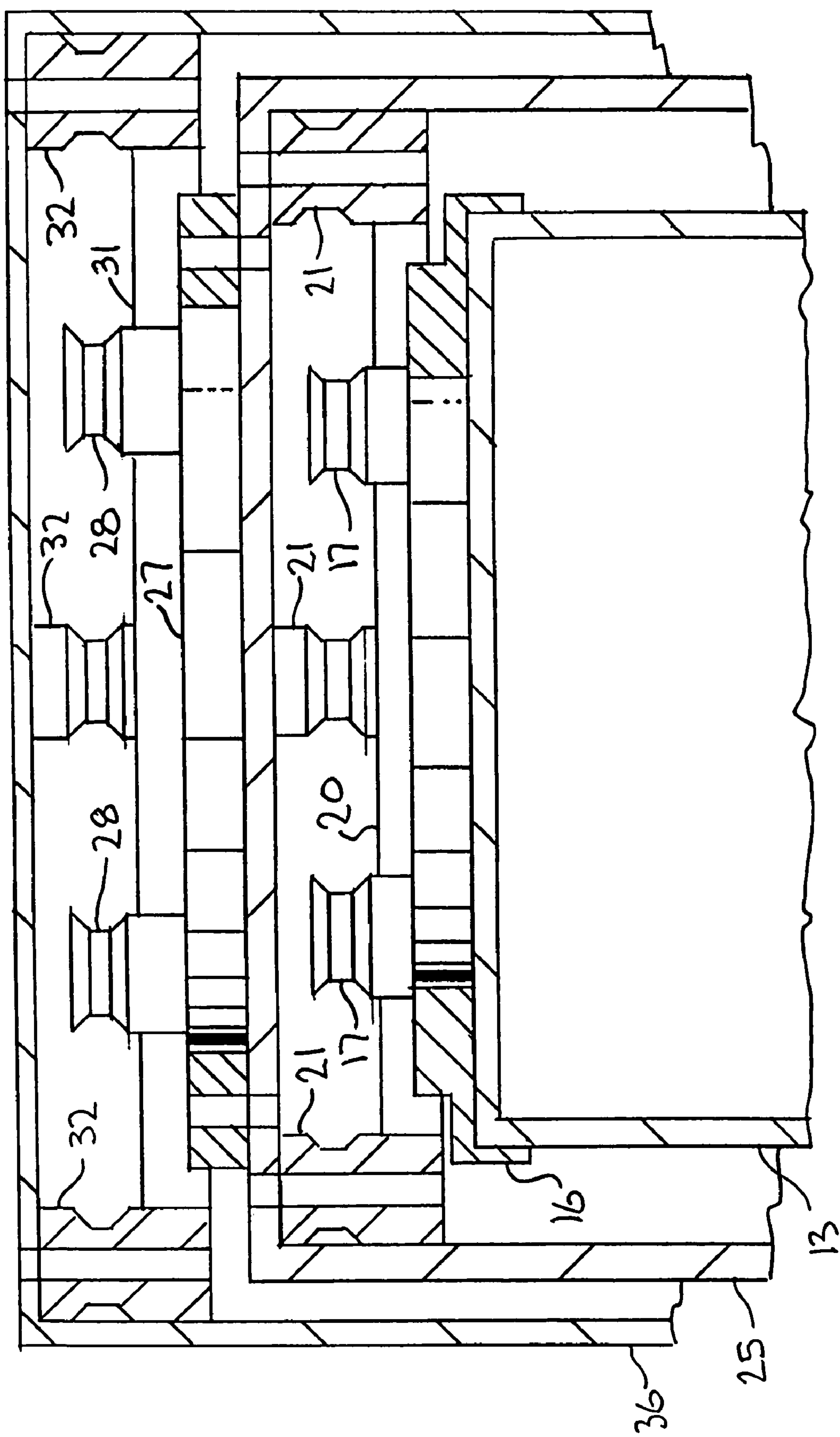
FIG. 4 is a cross-sectional view of the can section end of the thermal isolation structure shown in FIG. 2.

Adjacent enclosures (and sections) of the isolation structure are separated from and suspension mounted to each other by means of, for example, a plurality of low or non-thermally conducting lattice structures. FIG. 3 shows the details of one exemplary lattice structure comprising a pair of ring-shaped connectors, such as inner ring 18 and outer ring 22. It is notable that the terms “outer” and “inner” used to describe the rings do not refer to diameter size, rather to the relative radial position from the core. Thus while the drawings show the outer ring 22 having a greater diameter than the inner ring 18, the diameter configurations may be reversed in the alternative. In any case, the inner ring 18 includes a plurality of tie posts 19, and the outer ring 22 also includes a plurality of tie posts 23. The posts for each dual ring pair may extend in the same direction or in opposite directions. In FIGS. 2, 3 and 4, the posts at each end are shown extending in the same direction. In particular, posts 17, 21, 28, and 31 are shown extending in the same direction at one end of the isolation structure. And posts 19, 23, 30, and 34 are shown extending in the opposite direction at the opposite end of the isolation structure.

Tie downs, such as flexible stringing 38, are used to connect the posts of the outer ring to the posts of the inner ring to coaxially secure and locate the two rings with respect to each other, similar to the spokes on a bicycle wheel connecting and centrally locating the hub to the rim. A low thermal conductivity material, such as Kevlar string, may be chosen for the tie downs, and placed under tension, sewn or laced between the coaxial components. Kevlar string is an attractive choice for its low thermal conduction, low electrical conduction, and strength properties. Alternatively, other low thermal conduction materials, such as aerogel, may be utilized for the suspension-mount to tailor the heat load reduction to a cooler capacity.

The exemplary dual-ring suspension mounting lattice structure of FIG. 3 is utilized in FIG. 2 to suspension-mount all adjacent enclosures to each other whereby direct contact between adjacent enclosures is prevented. In particular, two pairs of rings are utilized to suspension-mount an enclosure from an adjacent nested enclosure at opposite ends thereof. Thus, rings 16, 20 and 18, 22 are shown utilized to suspension-mount the first enclosure 12 with the second enclosure 24, and rings 27, 31 and 29, 33 are shown utilized to suspension-mount the second enclosure 24 with the third enclosure 35. For each ring pair, an inner one of the rings is securable to an inner, diametrically smaller one of an adjacent pair of enclosures, and an outer one of the rings is securable to an outer, diametrically larger one of the same adjacent pair of enclosures. Each ring may be attached to a corresponding enclosure using, for example, conductive screws to produce a metal-to-metal connection. This manner of connection, however, does not cause a thermal shunt because thermal resistance is provided by the tie down string which connect the posts of the inner rings to the outer rings.

FIG. 4 shows a representative can section of the isolation structure illustrating the suspension-mounting described above. An inner ring, such as 16, is secured to an inner nested enclosure, e.g. the first can section 13 of the first enclosure (12 in FIG. 2). And an outer ring, such as 31, is secured to an outer nested enclosure, e.g. the second can section 25 of the second enclosure (24 in FIG. 2). The order of assembly may proceed, for example, by first attaching the inner ring 16 to the outer surface of the first can section 25, followed by using the tie downs (not shown) to sew, lace, or otherwise string the outer ring 20 thereto by means of the posts 17, 21. Next, the second layer of the isolation structure is produced by attaching the second can section 25 to the outer ring 20. In particular, the second can section 25 is shown contacting the posts 21 of the outer ring 20 for connection therewith. As an alternative method of assembly, the inner an outer rings may be pre-strung together, prior to securing to any enclosure. In this method, the combined pair of rings are attached to the inner enclosure as a unit, followed by attachment of the second enclosure thereto.

In any case, this manner of assembly may be continued for subsequent layers of the isolation structure in a building block approach to produce a multi-layer/enclosure construction for successively encapsulating the radiation detector. For example, a third layer of the isolation structure is formed in FIG. 4 by attaching an inner ring 27 to the outer surface of the second can section 25. An outer ring 31 is suspension-mounted from the inner ring 20 via tie-downs (not shown) secured around posts 28, 32. And finally a third can section 36 is positioned to contact the posts 32 of the outer ring 31 and secured thereto using, for example, screw fasteners. It is notable that three enclosure layers are shown in the drawings; however, more layers may be added in a similar manner, i.e. multiple layers may be utilized. Furthermore, the suspension-mounting of the representative can section is shown repeated in FIG. 2 for the first, second, and third cap sections 15, 26, and 37 as well, with rings 18, 22 suspension mounting the first and second cap sections, and rings 29, 33 suspension mounting the second and third cap sections. In this manner, direct contact between adjacent enclosures is avoided and a suitable spacing is maintained therebetween, while producing a rigid construction.

In this manner the enclosures may be non-contactedly suspension-mounted to each other to provide impact tolerance, and simultaneous thermal isolation. Thermal isolation is attributable to the reduction of thermal conduction combined with the operation of the IR reflecting shields. In particular, the heat load on the core radiation detector is reduced below the capacity of a cooler, where the heat load comes from (1) the spokes conducting in some heat, and (2) the material surfaces radiating some heat, making up the total heat load. Holes or other structural penetrations in the coaxial thermal shields are sources of direct heating from the outside to the cold interior. Thus, holes are minimized in the present invention to only those necessary for electrical connections (which are subsequently sealed). There are no penetrations through the thermal shields to provide structural mounting struts. This is in contrast to methods in the prior art using metal struts or Kevlar strings that directly connect the inner cold part directly to the hot outside structure. String or strut holes in the thermal shields would reduce the effectiveness of the thermal shields, such as by requiring a larger cooling pump. Thus the benefits of the IR reflector coatings are maximized in the present invention because no holes are required for the structural mounting points.

The volumetrically nested configuration of the isolation structure enables each enclosure, i.e. shield layer where coated, to incrementally reduce the IR heat loading on the core. For example, using a commercially available 300 milli-watt (heat lift) Hymatics cooler, the first shield has been shown to reduce the ultimate temperature of a 4 cm by 4 cm crystal by about 50 degrees K below the lowest attainable temperature without the shield. A second encapsulating shield has been shown to further reduce the ultimate temperature by about 35 degrees K, and a third shield further reduces the temperature by about 20 degrees K. More shielding may be utilized approaching a point of diminishing return. The substantial heat load reductions by the IR shields enables the use of a lower capacity heat-lift (e.g. 0.3 watt heat lift) pump adequate for cooling a 4×4 cm crystal to 100 K (having a cylindrical configuration with a 4 cm diameter, and 4 cm length.) Additionally, by using a higher set-point cooler, such as one having about 0.6 watts heat lift, the lift can be applied to a much larger crystal, such as a 5×7 cm crystal, which is a volume increase of about a factor of three.

Alternatively, the larger capacity 0.6 watt heat lift pump may be used to cool a smaller crystal, with the available excess capacity enabling a variety of other applications. For example, small-crystal high-resolution detectors are possible where the pumping work is a fraction of the pumps capacity, by simply turning down the pump speed and allowing microphonics to be minimized thereby. Normally the pump is run at maximum capacity which produces an inherent vibration due to the motion of the pump piston. Running the pump at a lower heat pumping rate reduces the amount of vibration. A smaller crystal detector needs less cooling power. Accordingly, by improving the heat losses (with the thermal shields), cooling may be reduced by slowing the pump speed and thereby reducing vibration. Also, vibration induces a degradation in spectroscopic resolution. Thus reducing vibration by turning down the pump is very desirable.

Another use for excess pumping capacity realized by the thermal isolation may is to cool an FET (Field Effect Transistor) that may be mounted on the cold capsule, to improve resolution. The signals from the crystal are first amplified by a transistor. It is known that if this transistor is cooled, it adds less noise to the signals it amplifies. If cooling capacity were available for the FET, then higher performance detectors are possible.

A third application simply uses the large crystal to improve the sensitivity for detecting weak sources, such as those typically found in illicit trafficking. Although, use of an FET typically improves the resolution by about a factor of two, it is not always necessary to improve resolution; simply determining the presence of a hidden radiation source is all that is required. This is typically hard for a hand-held detector because lightweight typically translates to low sensitivity. The cooling capacity may be applied to cool a large crystal, without a FET, and still achieve a significant detectivity advantage over other small hand held detectors. In particular, this resolution advantage is still on the order of about a factor of about ten or more over other detectors (where typical resolution of scintillators is about 7% of the gamma-ray energy).

Implicit in this approach is that the crystal cools to operating temperature. Operating temperature is achieved without dependence on a supplemental cooler. The benefits are obviously power reductions. In comparison, HPGe detectors have almost exclusively relied upon high power cooling (e.g. liquid nitrogen, LN). Alternatively, very small crystals were used where cooling is not a big burden, or an active approach (such as shield temperature control) was used which consumes power. In comparison to the low power cooler of the present invention, LN cooling has nearly an infinite capacity to pump heat, and thus there is no need to lower the heat load from radiation. However, the power requirements of such a cooling system are very great, making it difficult to reduce the size, weight and complexity of the HPGe detector.

Figure 5:
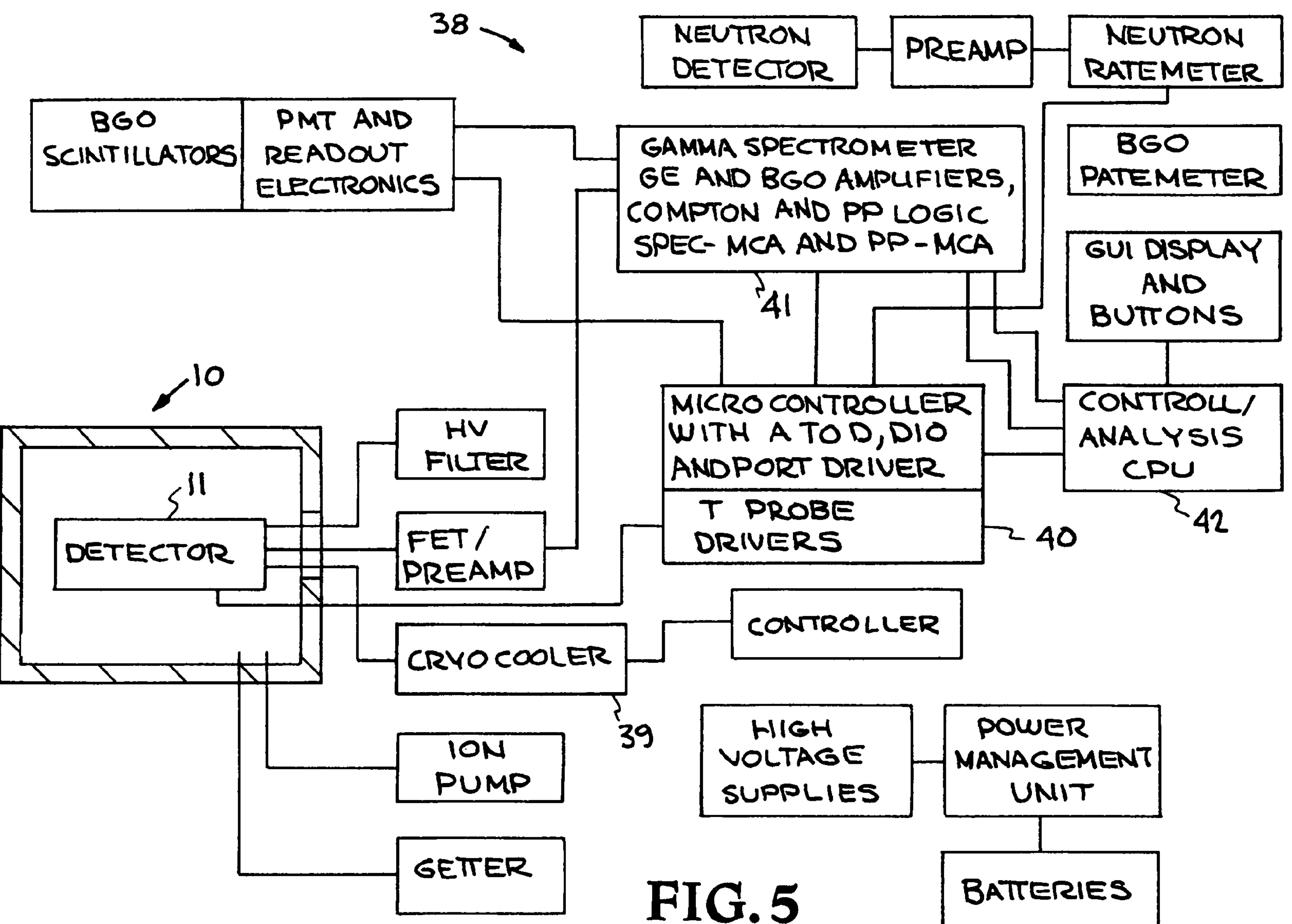
FIG. 5 is a schematic diagram of the functional components of the portable radiation detection apparatus of the present invention.

As shown in FIG. 5, the thermal isolation structure 10 is utilized in conjunction with a compactly-sized, portable radiation detection and analysis apparatus, indicated at reference character 38. Many of the functional components of the radiation detection apparatus are shown in FIG. 5, with the system being relatively small, approximately the size of a “bread box,” and suitable for hand-held and/or totable operation on a user’s person. In particular, integration of the thermal isolation structure 10 together with other functional components (some commercially available) enables system viability as a compact, lightweight, completely functional stand-alone unit, weighing about twenty-five pounds and suitable for toting on a user’s person and handheld operation. Additionally, lightweight battery operation of the HPGe crystal and apparatus is enabled by the use of the thermal isolation system, as discussed above, due to the lower power requirements for cooling the core to cryogenic temperatures.

Enabling the system of up to about 25 pounds total weight, including batteries that power the system for about 6 hours, is basic power management combined with using small parts. The cooler pump 39 uses about ten watts. And the electronics use about four watts which powers, for example, a significantly powerful computer 42 (e.g. a 200 MHz strongarm CPU, ~100 MIPS) and other electronics, such as two low power high voltage supplies for detector bias and vacuum pumping, a multichannel analyzer (MCA), DC filtering circuits, multiple serial port connections for all system communications, an integrated power management control system, amplifiers for preparing the HPGe signal for the MCA, a Compton rejection logic circuit, amplifiers for a Compton detector, high voltage for the neutron detector, amplifiers for the neutron detector. The vacuum system consists of a getter and a miniature ion pump that uses very little current to pump gases that the getter absorbs poorly.

Power management of the system is automatic and controllable from the serial port to the PC. It provides power routing, DC levels for a variety of different parts, checks for when to charge the PC. Power may be supplied by internal batteries or from an external power source. When external power is available, it may be used to simultaneously charge batteries and power the cooler and electronics. Inputs are provided for most any power source including DC and AC, low and high voltage.

A housekeeping controller 40 in FIG. 5 provides counting functions for pulses from the HPGe, Compton, and neutron detectors, controls the HV for HPGe and vacuum system, monitors voltages and currents for vacuum system, measures temperature of the cryogenic load, monitors and adjusts the vibration inherent in the mechanical cooler, (vibration management is available via the serial port under control of the computer). The housekeeper functions to rout signals such that Compton and HPGe inputs may be internally provided to two MCA's or split the Compton rejector into two halves that can be checked for coincidence (a pair spectrometer) and/or use the Compton signal to suppress the continuum in one MCA.

Another function of the housekeeping controller 40, is that the temperature of the HPGe crystal may be monitored on a real time basis. This feature may be used to know what the energy calibration will be at all times. This is in contrast to the typical reality that any temperature changes in the crystal cause the energy calibration to change. Thus, an operator need not continually recalibrate his detector, such as when he works in the sun or as he makes measurements both indoors and out. Instead, the energy calibration is measures at temperatures that span the practical range of detection, i.e. temperatures measured in the field, as opposed to in a controlled laboratory environment. The computer constantly monitors, via the housekeeper, the crystal temperature, and whenever data is collected, the current calibration obtained from a calibration coefficient lookup table, shown in Table 1, is used in any real time analysis, or written into the data file.

TABLE 1

| Temp | k0 | K1 | k2 | k3 |
|---|---|---|---|---|
| 101 | 2.4372 | 0.69858 | −1.0122E−06 | 1.7897E−10 |
| 106 | 2.5929 | 0.6972 | −6.4280E−07 | 1.2254E−10 |
| 112 | 2.3303 | 0.69635 | −3.6137E−07 | 2.1692E−11 |
| 116 | 2.3956 | 0.69605 | −8.2687E−07 | 1.5323E−10 |
| 120 | 2.2233 | 0.69549 | −8.5864E−07 | 1.5179E−10 |
| 124 | 2.6952 | 0.69433 | −7.0885E−07 | 1.4665E−10 |

Energy Calibration is obtained from the equation:

$$e=k0+k1*c+k2*c^2+k3*c^3$$

where, e=energy; c=channel number from Multiple Channel Analyzer (MCA), k0, k1, k2, k3=constants from table below depending on temperature. Interpolation is used if not at exact temperatures shown. The energy coefficients are preferably stored in a database, and used automatically in real time for calculation and analysis. In this manner, the housekeeping controller 40 provides auto-energy calibration by monitoring temperature sensitive components (i.e. HPGe crystal) for use with a calibration coefficient lookup table. A mechanism may also be provided which implements a one-time factory-built-in energy calibration. System logic may additionally be provided that uses crystal temperature to provide the user/operator the energy calibration data (for use in interpreting saved data). Or system logic may be provided that uses crystal temperature to adjust cooling to provide optimum battery capacity usage, i.e. end-of-charge extension by terminating or reducing cooling power while adjusting calibration as crystal temperature drifts. And temperature may be used as a control, upon power cooling actions, to simultaneously manage microphonics.

Self protection is a feature that is built into the system via the housekeeper circuit. The ion pump current is monitored and if it exceeds a preset value, the system will report an error (vacuum leak) and shut down. If the temperature of the crystal exceeds a preset maximum, the high voltage bias will be shut down, preventing damage to the crystal. Insulation quality monitoring may be employed simultaneous with air pumping by using a vacuum ion-pump to pump and monitor the pressure. Vacuum and temperature may also be monitored to optimize and predict useful system lifetime, i.e. how long until the battery is dead. Additionally, vibration control is also monitored using an accelerometer. If the signal is too high, the motor power is reduced. This can be viewed/used as microphonics control, power management, or a mechanism to identify mechanical coupling to external hard structures. The latter is a problem with the motor, where it has a resonant damper internal to it that behaves well if not coupled to external structures. When accidental coupling occurs between the detector housing and some other structure, the internal resonant damper may fail to counterbalance the motor. An internal monitor is used that notes the system vibration and adjusts the power input as specified by the computer. Computer control allows the system to run the pump motor to meet many operational objectives. It is notable that, while not necessary, signal processing may occur to check harmonics in pursuit of reducing microphonics.

Computer software is also provided to control the user interface. Accessible by touch screen on the computer are, for example, four functions including: search, identification (ID), data collection, and view housekeeping. Search is implemented by directly reading the count rates from the N and G inputs from the housekeeper. The low efficiency N detector has a special algorithm to provide instantaneous count rate on a one second basis, and an average count rate that is based on the interval between counts. This interval monitoring is useful with low efficiency counting systems where the low efficiency would usually give a zero average, yet the real average is non zero and should be computed over a variable observation time. Without knowing what a neutron source strength will be, one cannot set an arbitrary observation time without either forcing the operator to wait too long, or missing the rare counts and reporting the wrong rate. The rate is computed based on when the counts occur rather that when the clock mandates the end of the count. This process ensures a nonzero count rate that updates at the maximum rate possible. Presentation of data may be provided by a sliding bar chart graph that slides in one-second slices across the screen. Vertical scale is a log scale where the decade changes are noted by color change in the top part of the bar. This negates the need for a scale to be placed or read by the operator. Both N and G charts are presented. The real time rates are printed on the screen. Thus, an onboard display may be utilized for displaying results obtained by the data processing means.

Generally, the identification of isotopes by the system involves a process of looking for peaks in the gamma-ray spectrum. Since the energy calibration is known, the computer knows which channels to read from the MCA. This selective read saves time, allowing a large number of peak regions to be acquired every second. Each peak region is then analyzed for statistical significance, above a linear background that is computed from three channels on each side of the region. Both the statistical significance and the attribution to an isotope are presented in a rapidly changing table of rank sorted isotopes. When specified line pairs are present in statistically significant amounts, an entry is made in the lower part of the screen, stating the ID. The top part of the screen may be, therefore, a view of the real-time growth in confidence and the bottom is the statistically significant observation (analysis). Some operators desire to see the data grow in and they obtain this from the top window. Other operators simply want the answer, which is presented in the lower window. Gamma ray lines are specified with a user edited table that allows for single, double, or triple coincidence. The statistical requirement for an ID depends on how many coincidences are entered. The more coincidence required, the lower the individual line significance is required for a detection to be made. Additional constraints on ID include peak ratios or peak-to-Compton ration. This saves count time by trading any increasing spectral uniqueness for individual peak statistical significance, automatically.

Preferably, the identification process operates using a general purpose language for high resolution detectors, that runs in real time, and is largely based on the known signatures of nuclides, isotopes, and combinations of nuclides and isotopes which are detectable using the high-resolution HPGe detectors. It also may depend on characteristics of the detectors present. Generally, the process is capable of digesting the information provided by such high-resolution HPGe detectors by running the interpreter repeatedly so that the data is continuously updated and reprocessed. The real time nature of the identification process is provided by running the language interpreter repeatedly, on a substantially short time scale/interval from about one second to about five seconds, and preferably one second. The general purpose language utilizes Boolean/logical variables having a value of either true or false as well as quantitative values that are evaluated by the interpreter to identify nuclear material type. As the data is collected, the information content in the gamma-ray spectrum and other detectors, such as high rate dose meters and neutron detectors grows.

Figure 6:
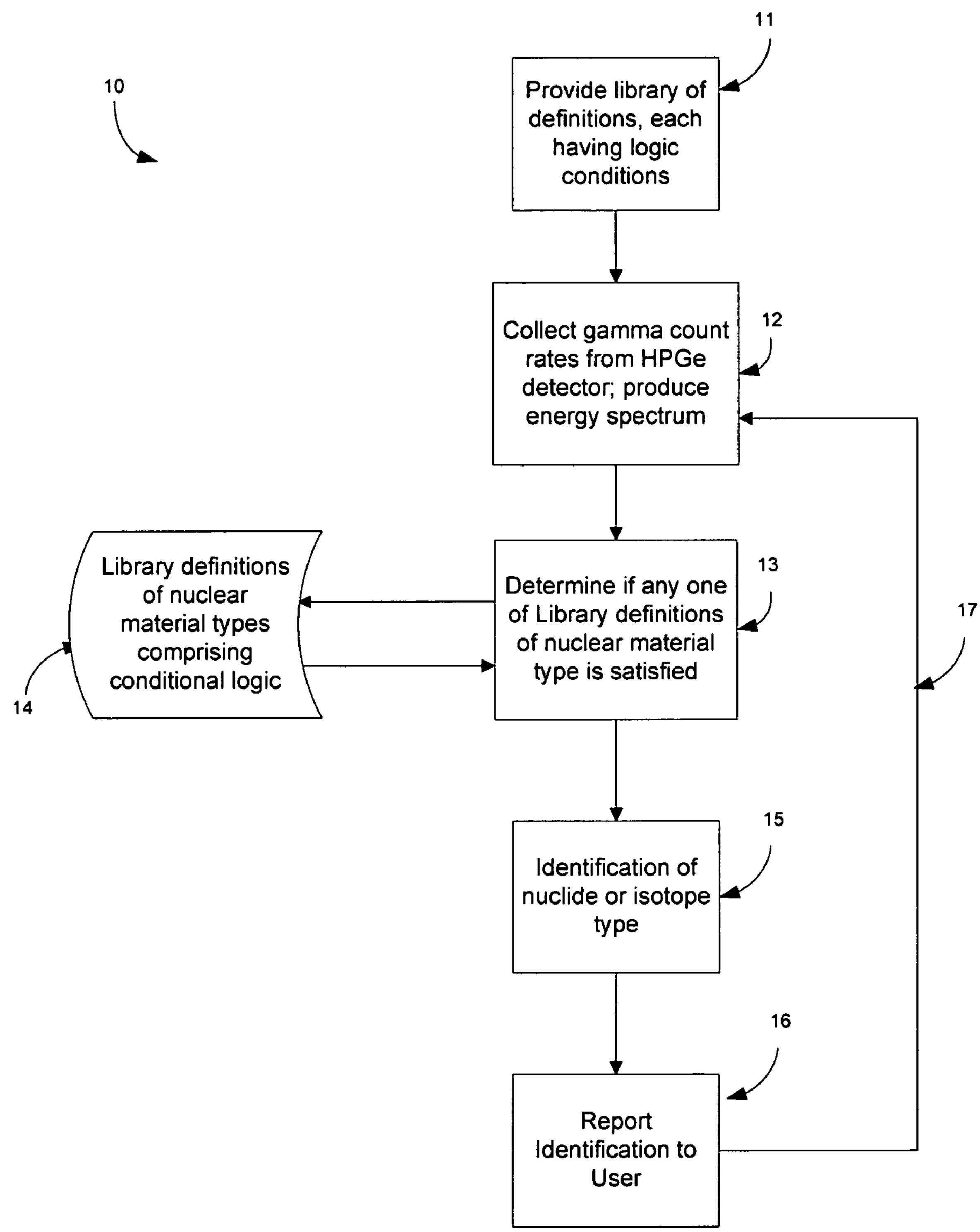
FIG. 6 is a flow diagram of the overall identification process.

Details of the basic ID process are shown in FIG. 6, generally indicated at reference character 10. First, as indicated at 11, a data library of nuclear material definitions is provided. Each definition is associated with a known nuclide, isotope, or material, and comprises at least one logic condition associated with a spectral parameter of a gamma-ray energy spectrum. The spectral parameters may include at least one of: peak region significance, pre-defined regions of interest ("ROI"), and ratios of the values of peak regions and ROIs. The predefined logic conditions of the library definitions include logical value requirements of true, false, and combinations thereof for different logical variables. Next, at 12, gross count rates are collected from the instruments detectors to produce the high-resolution gamma-energy spectrum. Gross count rates may also be used as a spectral parameter, the logical value assignment for which may trigger or otherwise satisfy a logic condition.

Then at 13, a determination is made whether any one of the library definitions and its associated logic conditions are satisfied by the spectral parameters provided by the high-resolution energy spectrum. To this end, peak regions in the energy spectrum are evaluated for statistical significance. The presence of sets of pre-defined peak groups known to be associated with a known nuclide or isotope is determined, but is often not determinative of a particular nuclide, isotope or material, and is therefore utilized in conjunction with other logic conditions for positive identification. In this manner, both false positives and false negatives may be reduced and/or eliminated. The definitions are accessed from a previously stored database as indicated at 14. At 15, nuclides, isotopes, or other material types are identified based on whether all logic conditions corresponding to a particular library definition are met. To this end, a determination is made initially if statistically significant peaks matched the definitions of peak groups. Next, the identification may be reported to an operator, as indicated at 16. The real time process of the present invention involves the iterative repeating of the method steps, as shown at 17, to update the spectrum and cumulatively reprocess the identification determination in real time, e.g. once every about 1 to 5 seconds, but preferably every second.

At early times in the detection, the bulk of the information is in the gross gamma count rates. Knowing the count rates for a particular detector, Boolean (logic) variables in the language and associated with the spectral parameters may be assigned with a "true" value, such as when the count rate falls within one of several pre-defined ranges which, for example, indicate earth-crust normal, elevated, and high count rates. When the rates fall within one of the many user specified bins, a label associated with the bin (a Boolean variable) turns logically "true". Based on the Boolean values for the pre-defined ranges, pre-defined messages are then passed to the operator to encourage appropriate data acquisition behavior, i.e. a true state will cause a message to be sent to the operator, which may also be user specified. Messages for the operator may include anything, but a useful set may include such messages as, "consistent with background, keep counting", "elevated background, keep counting and pay attention", and "caution high background, check dose rates and keep counting", or "time to leave, very fast".

As the information content in the gamma-ray spectrum grows with further counting, peaks or continuum structure in the energy spectrum start to appear. This information is processed when peak areas or continuum areas or ratios of these quantities exceed a specified significance threshold, sigma. At this point, subsections of the gamma-ray spectrum may be added. These are called regions of interest (ROIs). Any number of ROIs may be entered, each with a logical variable associated with it. When they go true, any messages may be sent to the operator. Next, photopeak areas are evaluated as discussed above, with each peak having a count, a significance, (sigma), and a logical variable associated with it. When the count exceeds sigma, the logical variable changes from false to true. Any number of peaks logical tests may be present.

Next, ratios of the numerical values, associated with true logical variables are calculated. Numerous ranges for the numerical values may be created, each with an ultimate meaning or message to be presented to the operator attached. For example, certain gamma-ray-peak net-area ratios, or ROI ratios, are sensibly associated with the observation of background, metal uranium, or beta emitters. It is the desired purpose to construct definitions that give desired reports to the instrument operator.

Next, isotopes or nuclides are identified by checking the existence (logical true) of groups of peaks. If one or two or any number of peaks is true, one may construct a definition that reports the presence of a nuclide, element, or isotope, for example, Plutonium. As many peaks as desired may be entered. For example, it is useful to have multiple definitions of Pu to address the information content in the GR spectrum at various count times. For example, one may define Pu as true 375 and 414 peaks for large masses of shielded Pu. A useful second definition may be unshielded Pu based on the 129 and 98.78 peaks. Any number of sets may be entered. The language syntax specifies any number of conditions with the number of conditions, followed by the logical labels for the peaks. These Boolean evaluations of existence become new Boolean variables that are either true for false, depending on the information content in the gamma-ray spectrum.

Next, high level reports are constructed with syntax that states the number of conditions before, that number of conditions, when true, trigger a message specified with P"message1", S#, N:"message2" commands. The point is either the logical list is all true or not and the desired messages are either the message1 or message2. After evaluation of the Boolean variables, the S# command is used to skip the next # logical tests. This gives the programmer of the language the flexibility to preclude inconsistent messages to the operator. For example, if we determine that nuclear material is present, the language commands may be ordered to skip the following "consistent with background" message. Any number of alternatives may be skipped, and nested skips are allowed.

Additional logic is allowed to determine the existence of some condition, based on a true variable and the negative of another variable. This is specified by using the "~" character in front of the desired variable. This may be used, for example, to identify the presence of Pu, and for certain sensibilities, preclude the reporting of Am since if there is Pu, there is also always Am but the operator may not care about the minor isotope. The generality of the language allows one to meet numerous intents, including highly abstracted messages or literal statements of all conditions present. Any combination of the logical variables may be used.

An illustration of the aforementioned method may be described for the case of highly enriched uranium (HEU). For this case, 2 logic conditions is required for positive identification: line 583 of the energy spectrum must be false (i.e. no peak is found at 583 KeV), and the ratio=of line 185 to line 1001 of the gamma-ray energy spectrum must be true for the ratio 600: infinity. For line 1001 the significance is preset with a sigma of 4.0 and for line 185, the significance is preset with a sigma of 5.

Data collection by the system involves a process where the user has a chance to collect a spectrum, look at it, and/or save it. The screen provides the plot of the full spectrum. It can be expanded for detailed examination. Linkage with the ID function is automatic in that if the user wants to know the spectrum that led to the identified isotopes, the spectrum is still in the MCA memory. The user can simply select the "get data" function and then save it. There is a clear memory button and a collect button. All of these functions have been intentionally simplified since most operators do not know how to operate an MCA. The save data button asks the user to enter the measurement distance and then the data is saved. The view housekeeping function provides a screen of numerical data that is consulted for status on the health of the entire instrument.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

What is claimed is:

1. A real-time method in a computer system for identifying radioactive materials, the method comprising:

providing a data library of nuclear material definitions ("library definitions") each uniquely defining a known nuclide, isotope, or material based on a set of at least one logic condition associated with a corresponding spectral parameter of a gamma-ray energy spectrum and which set of logic condition(s) is unique to the known nuclide, isotope, or material;

collecting gamma count rates from a HPGe gamma-radiation detector to produce a high-resolution gamma-ray energy spectrum;

automatically calibrating the detected gamma-ray energies based on a current temperature of the HPGe detector at the time of detection, by utilizing an energy calibration coefficient table having predetermined calibrations coefficients associated with predetermined temperatures of the HPGe detector;

determining whether the spectral parameters of said high-resolution gamma-ray energy spectrum satisfy all the logic conditions in a set of any one of said library definitions;

uniquely identifying the material type as that nuclide, isotope, or material having all of its set of logic conditions satisfied by the spectral parameters of said high-resolution gamma-ray energy spectrum; and reporting the identified nuclide or isotope type to an operator.

2. The method of claim 1, wherein the determination step includes evaluating peak regions of the high-resolution gamma-ray energy spectrum for statistical significance by determining whether the gamma count rate associated with a peak region exceeds a pre-set significance threshold, upon which a logical variable associated with a peak region is assigned a value of logical true.

3. The method of claim 2, wherein the logic condition(s) of at least one of the library definitions require coincidence in peak region significance.

4. The method of claim 2, wherein the determination step includes determining whether the count rate falls within pre-defined regions of interest ("ROI"), upon which a logical variable associated with one of said pre-defined regions of interest is assigned a value of logical true.

5. The method of claim 4, wherein, a pre-defined message is sent to an operator when the logical variable associated with an ROI is assigned a value of logical true.

6. The method of claim 4, wherein the determination step includes calculating ratios of numerical values associated with peak regions and/or ROIs, and assigning a logical variable associated therewith a value of logical true.

7. The method of claim 6, further comprising:

determining an applicable one of a set of pre-defined numerical ranges into which the calculated ratios fall; and sending to an operator a pre-defined message associated with the applicable numerical range.

8. The method of claim 7, wherein at least one numerical range is associated with a pre-defined message chosen from the group consisting of background, metal uranium, and beta emitters.

9. The method of claim 6, wherein the spectral parameters include at least one of peak region, ROI, and calculated ratio, and the pre-defined logic conditions of the library definitions involve at least one of said spectral parameters.

10. The method of claim 9, wherein the predefined logic conditions of said library definitions include logical value requirements of true, false, and combinations thereof for different logical variables.

11. The method of claim 1, wherein the method steps are iteratively repeated at substantially short time intervals to update the identification with cumulative data.

12. The method of claim 11, wherein the substantially short time intervals is in the range of about one to about 5 seconds.

13. The method of claim 12, wherein the substantially short time intervals is one second.

14. The method of claim 1, further comprising:

determining an applicable one of a set of pre-defined numerical ranges into which the gamma count rate falls; and sending to an operator a pre-defined message associated with the applicable numerical range.

15. The method of claim 1, wherein the identified nuclide or isotope type is reported to the operator via a display screen.

16. The method of claim 1, wherein the reporting of the identified nuclide or isotope type to the operator precludes the sending of inconsistent messages to the operator.

17. A computer system for identifying radioactive materials, the system comprising:

a gamma-ray detection module that converts gamma rays into electrical signals from which gamma count rates are collected and a gamma-radiation energy spectrum is produced;

a library module of nuclear material definitions ("library definitions") each uniquely defining a nuclide or isotope material based on a set of at least one logic condition associated with a corresponding spectral parameter of a gamma-ray energy spectrum and which set of logic condition(s) is unique to the nuclide or isotope material;

an energy calibration module adapted to automatically calibrate the detected gamma-ray energies based on a current temperature of the HPGe detector at the time of detection, by utilizing an energy calibration coefficient table having predetermined calibrations coefficients associated with predetermined temperatures of the HPGe detector;

a compliance module adapted to determine whether the spectral parameters of said high-resolution gamma-ray energy spectrum satisfy all the logic conditions in a set of any one of said library definitions;

an identification module adapted to uniquely identify the material type as that nuclide or isotope material having all of its set of logic conditions satisfied by the spectral parameters of said high-resolution gamma-ray energy spectrum; and means for reporting the identified nuclide or isotope type to an operator.

18. The computer system of claim 17, further comprising:

a peak region significance evaluation module that determines whether the gamma count rate associated with a peak region exceeds a pre-set significance threshold.

19. The computer system of claim 17, further comprising:

a reporting module adapted to report the unique identification to an operator.

20. A computer program product comprising:

a computer usable medium having computer readable program code embodied therein for causing the identification of radioactive materials, the computer readable program code comprising:

a database comprising a library of nuclear material definitions ("library definitions") each uniquely defining a nuclide or isotope material based on a set of at least one logic condition associated with a corresponding spectral parameter of a gamma-ray energy spectrum and which set of logic condition(s) is unique to the known nuclide, isotope, or material;

computer readable program code means for collecting gamma count rates collecting gamma count rates from a HPGe gamma-radiation detector to produce a high-resolution gamma-ray energy spectrum;

computer readable program code means for automatically calibrating the detected gamma-ray energies based on a current temperature of the HPGe detector at the time of detection, by utilizing an energy calibration coefficient table having predetermined calibrations coefficients associated with predetermined temperatures of the HPGe detector;

computer readable program code means for determining whether the spectral parameters of said high-resolution gamma-ray energy spectrum satisfy all the logic conditions in a set of any one of said library definitions;

computer readable program code means for uniquely identifying the material type as that nuclide or isotope material having all of its set of logic conditions satisfied by the spectral parameters of said high-resolution gamma-ray energy spectrum; and computer readable program code means for reporting the identified nuclide or isotope type to an operator.

* * * * *